US012000760B2

(12) United States Patent
Ben Fekih et al.

(10) Patent No.: US 12,000,760 B2
(45) Date of Patent: Jun. 4, 2024

(54) RESONANT FREQUENCY VIBRATIONAL TEST

(71) Applicant: UNIVERSITE DE MONS, Mons (BE)

(72) Inventors: Lassaad Ben Fekih, Mons (BE); Olivier Verlinden, Mons (BE); Georges Kouroussis, Mons (BE)

(73) Assignee: Universite De Mons, Mons (BE)

( * ) Notice: Subject to any disclaimer, the term of this patent is extended or adjusted under 35 U.S.C. 154(b) by 203 days.

(21) Appl. No.: 17/440,211

(22) PCT Filed: Mar. 13, 2020

(86) PCT No.: PCT/EP2020/056893
§ 371 (c)(1),
(2) Date: Sep. 17, 2021

(87) PCT Pub. No.: WO2020/187755
PCT Pub. Date: Sep. 24, 2020

(65) Prior Publication Data
US 2022/0146367 A1    May 12, 2022

(30) Foreign Application Priority Data
Mar. 18, 2019  (GB) ..................... 1903667

(51) Int. Cl.
*G01M 7/02*    (2006.01)
(52) U.S. Cl.
CPC .............. *G01M 7/022* (2013.01); *G01M 7/02* (2013.01)

(58) Field of Classification Search
CPC ................................ G01M 7/02; G01M 7/022
See application file for complete search history.

(56) References Cited

U.S. PATENT DOCUMENTS

| 2003/0154225 | A1* | 8/2003 | Neubert | G06F 17/10 |
| | | | | 708/446 |
| 2005/0041898 | A1* | 2/2005 | Yamada | F16C 19/54 |
| | | | | 384/490 |
| 2019/0293533 | A1* | 9/2019 | Warmuth | G01N 3/32 |

FOREIGN PATENT DOCUMENTS

JP    2012149979 A  *  8/2012  .............. G01M 7/00

OTHER PUBLICATIONS

Ben Fekih et al, New High Cycle Fatigue Test Facility of Adhesively Bonded Ceramic Electronic Components, Conference Proceedings, The Netherlands, May 28 through Jun. 1, 2018.
International Search Report and Written Opinion for PCT Application PCT/EP2020/056893.
UK Search Report for priority application GB 1903667.2.

\* cited by examiner

*Primary Examiner* — Peter J Macchiarolo
*Assistant Examiner* — John M Royston
(74) *Attorney, Agent, or Firm* — SCHNEIDER IP LAW; Jerold I. Schneider

(57) ABSTRACT

This invention relates to a resonant frequency vibrational test and a method of subjecting a component to such a resonant frequency vibrational test.

12 Claims, 2 Drawing Sheets

RESONANT FREQUENCY VIBRATIONAL TEST

This invention relates to a resonant frequency vibrational test and a method of subjecting a component to such a resonant frequency vibrational test.

It is common to run high cycle fatigue tests to various components, notably components for space activities, so as to determine their behaviour during their lifespan in shortened delays. Traditional apparatuses have numerous drawbacks including high power consumption, cost of the machine, as well as numerous technical difficulties related to stiffness tuning and alignment adjustment of the specimen. Besides, at high frequencies acceleration effects appear due to inertia of the load train, compensation becomes required in the control loop, also fatigue of the servo-valve itself could be expected. Furthermore, previous vibrational tests substantially comprise analog electronic processing circuits developed for specific motion sensors.

There is thus a need for a new resonant frequency vibrational test which is more efficient in terms of time, energy consumption and results.

According to one aspect, the present invention provides a method of subjecting a component to a resonant frequency vibrational test as defined in claim 1; other aspects are defined in other dependent claims. The dependent claims define preferred and/or alternative embodiments.

During a vibrational test of a component, it has been found that the resonant frequency of said component may shift, particularly due to internal degradation of the component. Consequently, if the exciter input signal is not adjusted during the test time, the vibrational test will be unreliable. For that purpose, the signal generator used to provide the exciter input signal is driven by a target frequency signal, the target frequency signal being an adjustment in frequency of the previous, notably non-adjusted, exciter input signal. This allows a better adjustment of the frequency of the exciter input signal, notably in real time. The vibration of the component and/or the vibration of the exciter are preferably measured by a motion sensor, preferably an individual motion sensor for each of the exciter and the component. In a preferred embodiment, the frequency control signal is based on the phase difference, obtained by Fourier series terms, between the vibration of the component and the vibration of the exciter, and notably at the exact excitation frequency. Using Fourier series instead of FFT (fast Fourier transform) is preferable as it involves the actual frequency of the component whilst the FFT provides an approximation of the frequency, thus resulting to a more precise and efficient vibrational test.

The exciter input signal may further be adjusted or modified by a target magnitude signal, i.e. a magnitude signal configured to provide a signal adjusting the magnitude of a previous signal, notably a non-adjusted signal. A target magnitude signal may be necessary when the resonant frequency has shifted during a vibrational test. Particularly when the resonant frequency shifts in frequency, the magnitude of the signal of the component may deviate from that desired and a magnitude correction may be required, based on a magnitude control signal which is the magnitude difference between the vibration of the component and a desired magnitude value, in order to keep the magnitude substantially constant during the resonant frequency vibrational test.

In one preferred embodiment, the exciter input signal, notably the smoothed exciter input signal, is adjusted in frequency and in magnitude by a target frequency signal and a target magnitude signal. Such a combination provides a better adjustment of the exciter input signal. By "smoothed exciter input signal", it is understood an exciter input signal which is smoothed in frequency and/or in magnitude.

Vibration of the exciter is preferably measured by a first motion sensor. The first motion sensor may be configured to measure at least one of the position, the velocity and/or the acceleration of the exciter, with or without contact with the exciter.

Vibration of the component is measured by a second motion sensor distinct from the first motion sensor. The second motion sensor may be configured to measure at least one of the position, the velocity and/or the acceleration of the component, with or without contact with the component.

The frequency control signal and/or the magnitude control signal may be smoothed. The smoothing of a control signal (frequency and/or magnitude) may be required when said control signal comprises parasitic components, for example white noise. Exciting the exciter with an exciter input signal adjusted with a frequency control signal comprising parasitic components may provide imprecision and/or instability of the frequency and/or magnitude adjustment. The smoothing of the frequency and/or of the magnitude control signal, notably if said control signal(s) is(are) substantially subject to comprise parasitic components, may be provided by rolling average and/or by a low-pass filter. The rolling average may be performed on at least 2, preferably 3, and more preferably 4 cycles of the control signal with possible overlap, for example at least 50%, at least 60%, or at least 70% overlap. This provides a smoothed control signal without substantial noise which also provides a more stable signal in time. Another advantage of such a smoothing is to avoid including parasitic components during the adjustment of the exciter input signal.

The signal generator, driven by a target magnitude and a target frequency, which is used for generating the exciter input signal or the smoothed exciter input signal may be a digital oscillator, for example a digital oscillator selected from a Hopf oscillator, a IIR oscillator or a library generated sine function. In one preferred embodiment, the signal generator is a Hopf oscillator. The Hopf oscillator consists essentially of two differential equations corresponding to a limit cycle, converging to a harmonic signal with target frequency and target magnitude. The Hopf oscillator is particularly preferred as it provides, inter alia, a smooth signal and naturally ensures soft frequency and/or magnitude variations, notably continuous soft frequency and/or magnitude variations. Another advantage of the Hopf oscillator over other signal processors, notably oscillators, such as IIR oscillator, is the possible adjustment of the rapidity to return to the limit cycle after the modification of the target frequency and/or of the target magnitude.

The adjustment of the exciter input signal according to the frequency target signal and the optional magnitude target signal, notably the smoothed frequency target signal and the optional smoothed magnitude target signal, may be performed by the signal generator, notably a Hopf oscillator.

The frequency target signal may be adjusted by a frequency control, notably a proportional integral control according to the difference between the frequency control signal and a desired value, preferably a desired value of 90° if the first and second motion sensors measure the same quantity (displacement, velocity or acceleration). In one embodiment, the magnitude target signal may be adjusted by the magnitude control signal adapted by a magnitude control, notably a proportional integral control according to its difference with respect to the desired magnitude value. In one preferred embodiment, the target signals are adjusted according to a frequency control signal and to a magnitude control signal, and more preferably according to the smoothed frequency control signal and to a smoothed magnitude control signal.

An embodiment of the invention will now be described, by way of example only:

Figure 1:
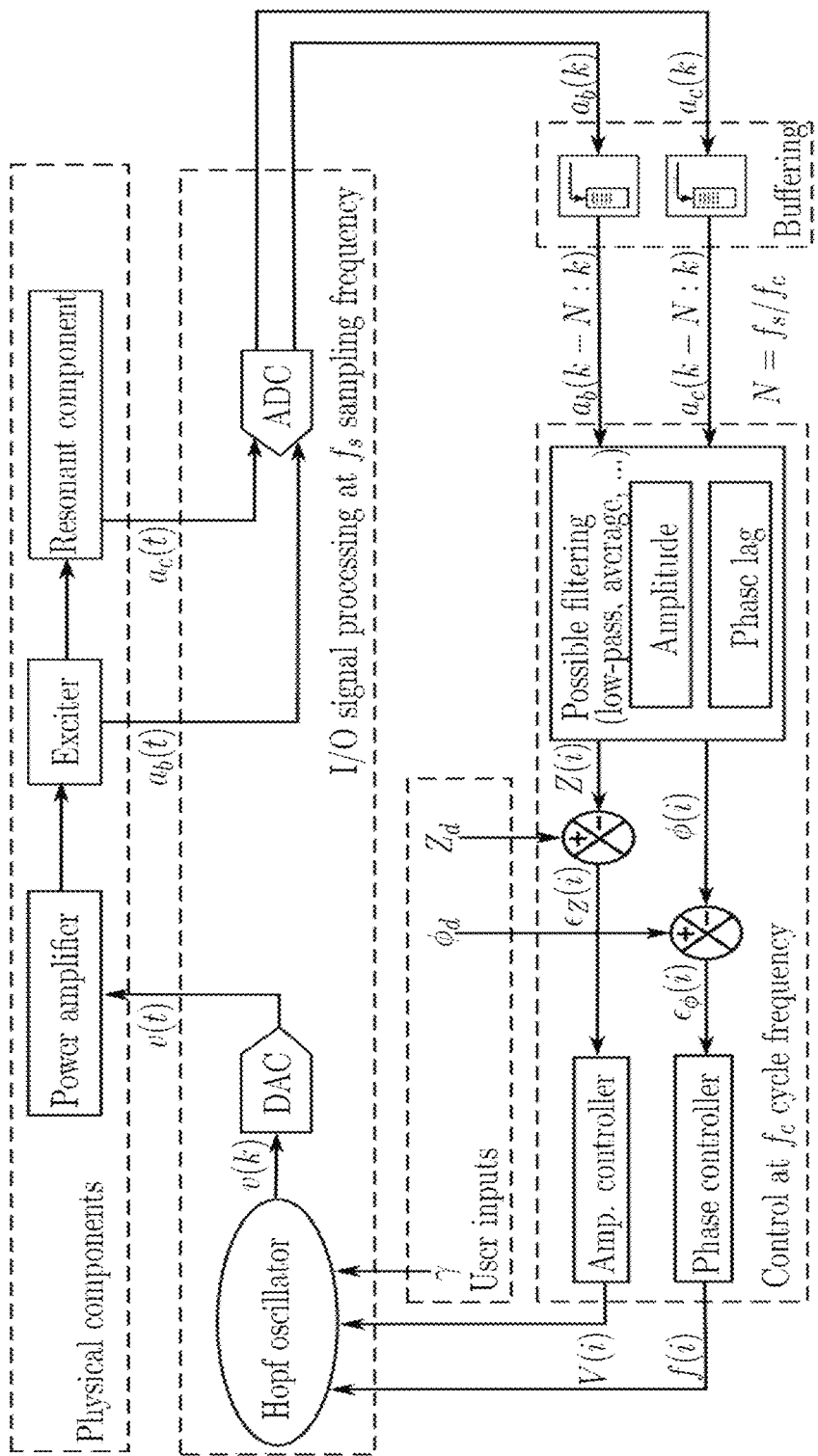
FIG. 1 shows a block diagram illustrating a method in accordance to the invention.
Figure 2:
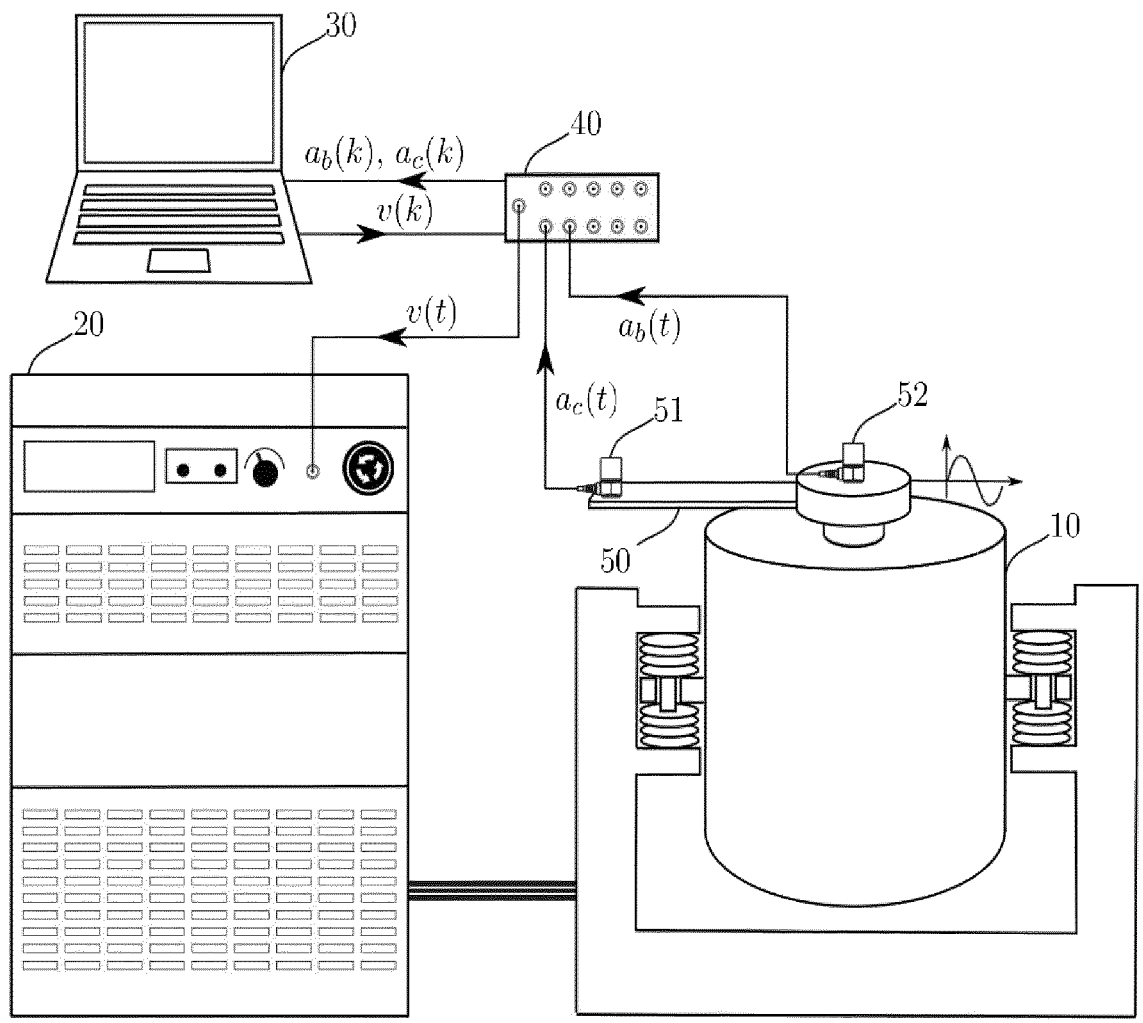
FIG. 2 shows a system for the resonant frequency vibrational test.

The system 1 for conducting a resonant frequency vibrational test illustrated in the block diagram of FIG. 1 comprises an electrodynamic exciter 10, a power amplifier 20, a control unit which can be a computer 30 and an acquisition card 40. FIG. 2 illustrates an example of component under test made of an beam-like assembly 50 having one end secured to the exciter. The other end is unsecured so to be moveable during the test. A first motion sensor 52 positioned at the moving armature measures the excitation signal $a_b(t)$. A second motion sensor 51, positioned at an end of the component, measures the response signal $a_c(t)$. The position of the motion sensor is notably based on the standard used, which depends on the component to be tested. The power amplifier 20 is required when using an electrodynamic exciter 10.

The exciter input signal is generated through a Hopf oscillator. The signal v(k) is generated according to the target frequency f(i) and target voltage magnitude V(i) input signals. It is only after its conversion via a Digital to Analog Converter (DAC) at $f_s$ sampling frequency that the exciter input signal v(t) is sent to the exciter.

The initial frequency f(i) is set in a resonance zone of the component while the voltage is set high enough to put the component in motion during the first cycle.

Vibrations induced in an armature of the exciter and the component are measured via the two motion sensors providing $a_b(t)$ and $a_c(t)$ signals, respectively. An Analog to Digital Converter (ADC) transforms $a_b(t)$ and $a_c(t)$ into discrete signals $a_b(k)$ and $a_c(k)$ at frequency $f_s$. t and k refer to respective time and sample number. After cycle i, phase lag $\phi(i)$ and magnitude Z(i) are evaluated from Fourier coefficients at $f_c$ exact actual cycle frequency. Phase lag and magnitude are possibly filtered to still improve smoothing, by e.g. averaging or low-pass filtering.

The frequency and magnitude target signals f(i) and V(i) are updated at $f_c$ through a proportional integral control for the phase and the magnitude. The latter are based on $\in_\phi(i)$ the difference between $\phi(i)$ and the theoretical phase at resonance and on $\in_Z(i)$ the difference between Z(i) and the desired magnitude $Z_d$ specified by the user.

The Hopf oscillator then adapts smoothly to changes of target signals f(i) and V(i). The oscillator can be tuned via γ parameter to adjust the speed of convergence to its stable limit cycle. This upstream smoothening of the exciter input signal v(k) distinguishes Hopf oscillator from other digital oscillators.

The invention claimed is:

1. A method of subjecting a component to a resonant frequency vibrational test in which the component is excited in vibration by an exciter on the basis of an exciter input signal, the method comprising:
providing, based on measuring the vibration of the component, a target frequency signal indicative of a frequency control signal which is the phase difference between the vibration of the exciter and the vibration of the component, the vibration of the component being measured by a motion sensor; and
exciting the exciter in vibration with a smoothed exciter input signal, the exciter input signal having been adjusted by the target frequency signal in which the smoothed exciter input signal is provided by a Hopf oscillator driven by the target frequency signal.

2. The method of claim 1, comprising:
providing, based on measuring the vibration of the component, a target magnitude signal indicative of a magnitude control signal which is the magnitude difference between the vibration of the component and a desired magnitude value, and
exciting the exciter in vibration with the smoothed exciter input signal, the exciter input signal having been adjusted by the target frequency signal and the target magnitude signal.

3. The method of claim 1, comprising:
providing, based on measuring the vibration of the component, a smoothed target magnitude signal indicative of a magnitude control signal which is the magnitude difference between the vibration of the component and a desired magnitude value, and
exciting the exciter in vibration with the smoothed exciter input signal, the exciter input signal having been adjusted by the target frequency signal and the target magnitude signal.

4. The method of claim 1, in which the smoothed exciter input signal is provided by:
smoothing the target frequency signal, and
using the smoothed target frequency signal to adjust the exciter input signal.

5. The method of claim 1, in which the frequency control signal is smoothed by a method selected from rolling average or by a low-pass filter.

6. The method of claim 1, in which the exciter input signal is continuously adjusted by the target frequency signal.

7. The method of claim 6, in which the target frequency signal is adjusted by a frequency control according to the frequency control signal.

8. The method of claim 6, in which the target frequency signal is adjusted by a proportional integral control, according to the smoothed frequency control signal.

9. The method of claim 6, in which the frequency control provides a smoothed target frequency signal.

10. The method of claim 6, in which a proportional integral control provides a smoothed target frequency signal.

11. The method of claim 1, in which the frequency control signal is based on the phase difference, obtained by Fourier series terms, between the vibration of the component and the vibration of the exciter.

12. A method of subjecting a component to a resonant frequency vibrational test in which the component is excited in vibration by an exciter on the basis of an exciter input signal, the method comprising:
providing, based on measuring the vibration of the component, a target frequency signal indicative of a frequency control signal which is the phase difference between the vibration of the exciter and the vibration of the component, the vibration of the component being measured by a motion sensor;
providing, based on measuring the vibration of the component, a target magnitude signal indicative of a magnitude control signal which is the magnitude difference between the vibration of the component and a desired magnitude value; and exciting the exciter in vibration with the smoothed exciter input signal, the exciter input signal having been adjusted by the target frequency signal and the target magnitude signal;

in which the smoothed exciter input signal is provided by:
  smoothing the target frequency signal, and
  using the smoothed target frequency signal to adjust the exciter input signal;
    in which the smoothed exciter input signal is provided by a Hopf oscillator driven by the target frequency signal;
  in which the exciter input signal is continuously adjusted by the target frequency signal;
  in which the target frequency signal is adjusted by a proportional integral control, according to the smoothed frequency control signal; and
  in which the proportional integral control provides a smoothed target frequency signal.

\* \* \* \* \*